US005943232A

United States Patent [19]

Gehi et al.

[11] Patent Number: 5,943,232

[45] Date of Patent: Aug. 24, 1999

[54] AUTONOMOUS OVERLOAD CONTROL FOR DISTRIBUTED REAL TIME SYSTEMS

[75] Inventors: Gopal Menghraj Gehi; Sheng Ling Lin, both of Lisle, Ill.; Kazem Anaraky Sohraby, Lincroft, N.J.

[73] Assignee: Lucent Technologies Inc., Murray Hill, N.J.

[21] Appl. No.: 08/959,933

[22] Filed: Oct. 29, 1997

[51] Int. Cl.[6] .............................. G06F 9/00; G06F 11/00

[52] U.S. Cl. .............. 364/184; 395/200.56; 395/200.65; 395/670; 370/231; 370/232; 370/236

[58] Field of Search ...................... 364/184; 395/200.56, 395/200.65, 670, 672, 673, 674; 370/231, 232, 236

[56] References Cited

U.S. PATENT DOCUMENTS 5,067,074 11/1991 Farel et al. .............................. 395/200
5,491,801 2/1996 Jain et al. .......................... 395/200.13
5,548,533 8/1996 Gao et al. .............................. 364/514

*Primary Examiner*—William Grant
*Assistant Examiner*—Carolyn T. Baumgardner
*Attorney, Agent, or Firm*—Werner Ulrich

[57] ABSTRACT

A method of responding to overload in a real time control system. Overload is measured through the use of a control parameter such as the occupancy of a control processor or the number of entries in a queue of a module of the system. The overload indication is reduced to one of a plurality of levels. The levels corresponding to a longer term more serious overload are based on control parameter measurements over a longer period of time than the less serious short term overload levels. With autonomous control, each module of the system determines its own overload level and performs overload control actions corresponding to that level. In integrated system overload control, a centralized processor receives overload indications from each of the modules of the system and requests an appropriate overload control action of each module. Advantageously, these arrangements allow the system and its modules to respond to overload more rapidly and to return to normal operation more rapidly.

5 Claims, 5 Drawing Sheets

201 CHOOSE A MEASUREMENT INTERVAL T

203 CHOOSE A WINDOW W(S) FOR OBSERVING THE NUMBER OF CONSECUTIVE T'S FOR THE SHORT-TERM OVERLOAD

205 CHOOSE A WINDOW W(L) FOR OBSERVING THE NUMBER OF CONSECUTIVE T'S FOR THE LONGER-TERM OVERLOAD

207 MEASURE CONTROL PARAMETER OVER INTERVAL (n). STORE W(L) PAST MEASUREMENTS

209 DETERMINE MEASURED CONTROL PARAMETER FOR INTERVAL (n), S(n) (SHORT-TERM) AND L(n) (LONG-TERM)

211 DETECT OVERLOAD AND TAKE CONTROL ACTIONS

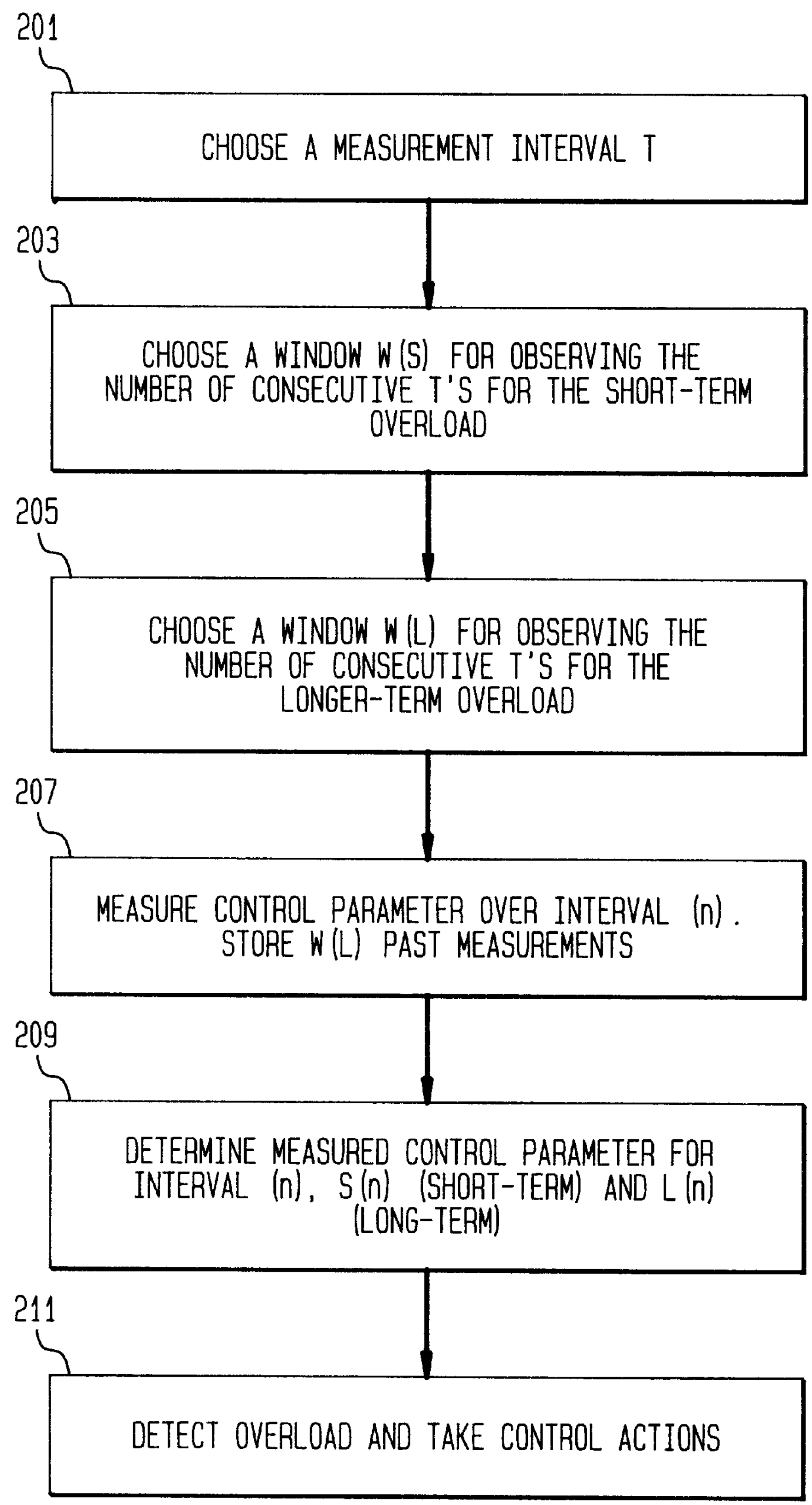
FIG. 2
201
CHOOSE A MEASUREMENT INTERVAL T
203
CHOOSE A WINDOW W(S) FOR OBSERVING THE NUMBER OF CONSECUTIVE T'S FOR THE SHORT-TERM OVERLOAD
205
CHOOSE A WINDOW W(L) FOR OBSERVING THE NUMBER OF CONSECUTIVE T'S FOR THE LONGER-TERM OVERLOAD
207
MEASURE CONTROL PARAMETER OVER INTERVAL (n). STORE W(L) PAST MEASUREMENTS
209
DETERMINE MEASURED CONTROL PARAMETER FOR INTERVAL (n), S(n) (SHORT-TERM) AND L(n) (LONG-TERM)
211
DETECT OVERLOAD AND TAKE CONTROL ACTIONS

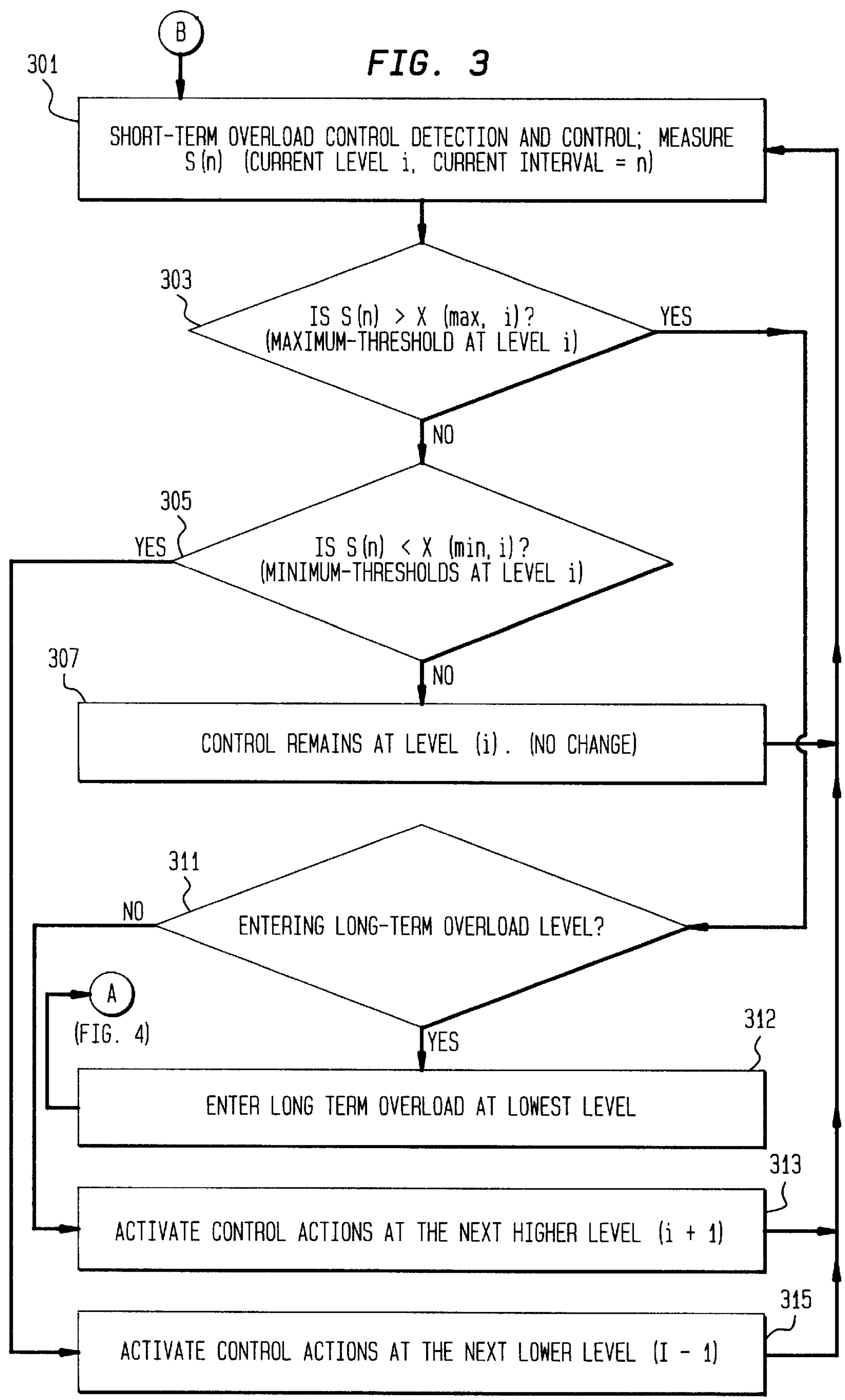

FIG. 3
B
301
SHORT-TERM OVERLOAD CONTROL DETECTION AND CONTROL; MEASURE S(n) (CURRENT LEVEL i, CURRENT INTERVAL = n)
303
IS S(n) > X (max, i)? (MAXIMUM-THRESHOLD AT LEVEL i)
YES
NO
305
IS S(n) < X (min, i)? (MINIMUM-THRESHOLDS AT LEVEL i)
YES
NO
307
CONTROL REMAINS AT LEVEL (i). (NO CHANGE)
311
ENTERING LONG-TERM OVERLOAD LEVEL?
NO
YES
A
(FIG. 4)
312
ENTER LONG TERM OVERLOAD AT LOWEST LEVEL
313
ACTIVATE CONTROL ACTIONS AT THE NEXT HIGHER LEVEL (i + 1)
315
ACTIVATE CONTROL ACTIONS AT THE NEXT LOWER LEVEL (I - 1)

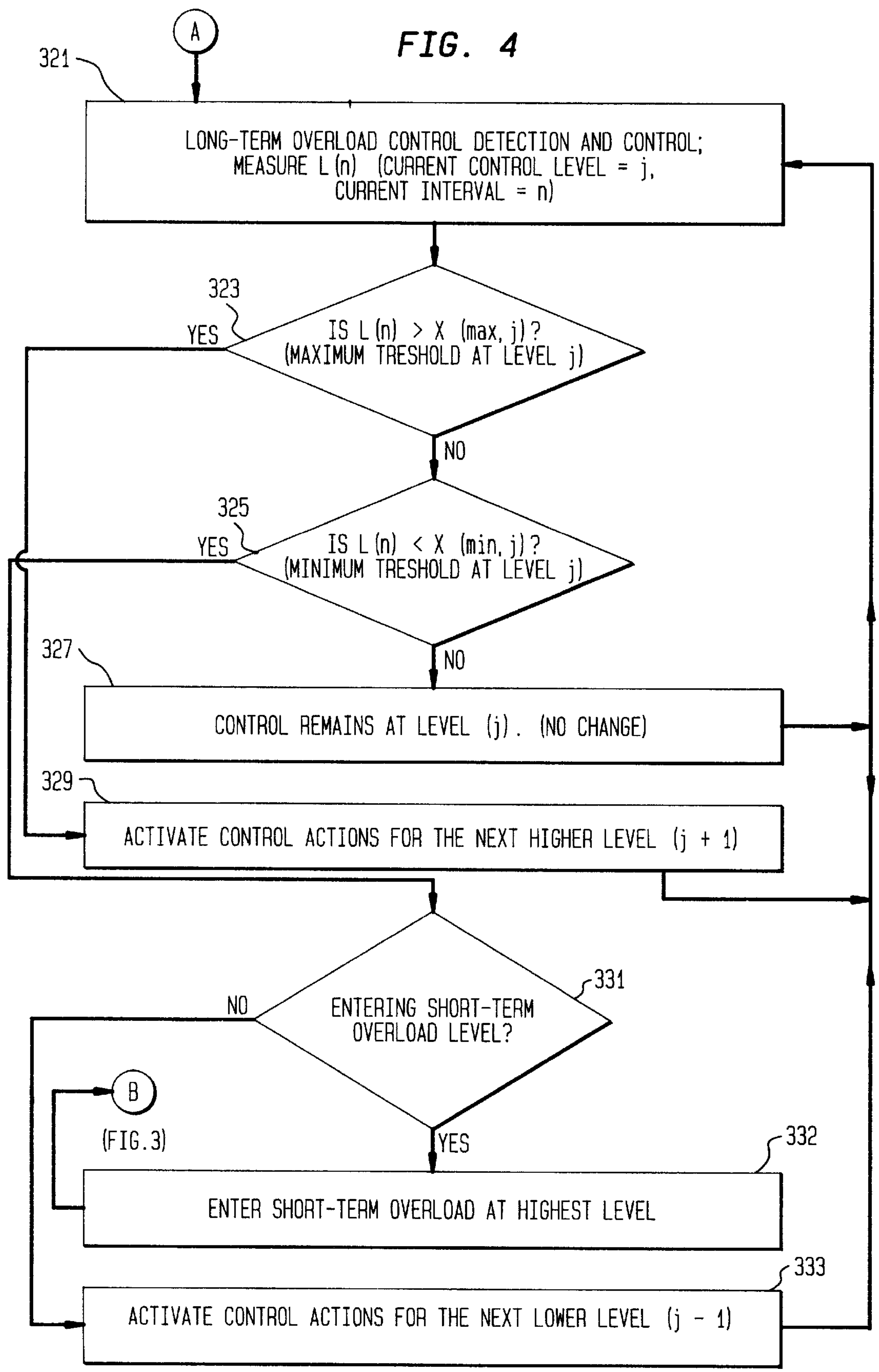
FIG. 4
A
321
LONG-TERM OVERLOAD CONTROL DETECTION AND CONTROL; MEASURE L (n) (CURRENT CONTROL LEVEL = j, CURRENT INTERVAL = n)
323
YES
IS L (n) > X (max, j)? (MAXIMUM TRESHOLD AT LEVEL j)
NO
325
YES
IS L (n) < X (min, j)? (MINIMUM TRESHOLD AT LEVEL j)
NO
327
CONTROL REMAINS AT LEVEL (j). (NO CHANGE)
329
ACTIVATE CONTROL ACTIONS FOR THE NEXT HIGHER LEVEL (j + 1)
331
NO
ENTERING SHORT-TERM OVERLOAD LEVEL?
B
(FIG.3)
YES
332
ENTER SHORT-TERM OVERLOAD AT HIGHEST LEVEL
333
ACTIVATE CONTROL ACTIONS FOR THE NEXT LOWER LEVEL (j - 1)

AUTONOMOUS OVERLOAD CONTROL FOR DISTRIBUTED REAL TIME SYSTEMS

RELATED APPLICATION

This application is related to S. Gehi, S. Lin and K. Sohraby: "Integrated Overload Control for Distributed Real Time Systems", Ser. No. 08/959,636, filed simultaneously with this application and is being assigned to the same assignee as this application.

TECHNICAL FIELD

This invention relates to method and apparatus for responding to overload conditions in real time systems.

PROBLEM

Real time systems, such as telecommunication systems must respond to requests such as requests for connections made by users, who cannot be controlled by the real time system. Accordingly, these systems are subject to overload if an unusually large fraction of the users make simultaneous demands on the system. In general in prior art arrangements, the systems respond to the overload conditions by deferring some deferable work and by shedding load, i.e., refusing to accept some fraction of the users' request for connections in one or more modules of the system. A problem of the prior art is that it has been found difficult to restore performance of deferrable tasks as soon as, in retrospect, it might have been possible to re-start these tasks, and to reassume acceptance of load as rapidly as, in retrospect, such load might be re-assumed.

SOLUTION

The above problems are significantly alleviated and an advance is made over the teachings of the prior art in accordance with applicants' invention wherein a distinction is made between short term and long term overload, wherein different techniques are used to alleviate short term and long term overload within a module, and wherein long term overload is invoked only if the declared short term overload level exceeds a threshold.

Advantageously, such an arrangement allows overload to be detected rapidly, to be responded to rapidly, and allows the alleviation of overload also to be rapidly detected and responded to.

In one specific embodiment of applicants' invention, the telecommunications system is a switching system having at least two types of modules, switch fabric modules for establishing connections and processor modules for processing the stimuli which result in controlling the switch modules. Internally, each processor and each switch module has a plurality of short term overload levels. A module stays in a particular overload level and performs the actions for alleviating overload that are associated with that level until the overload measurement indicates that the present overload state is outside the band of overload measurements characteristic of the present level. In that case, the overload level is either incremented or decremented by one level. If the decrement results in going to an 0 overload level, i.e., the level representing the absence of overload, then overload corrective actions are terminated. If the overload measurement exceeds the upper bound of highest short term overload level, then a lowest long term overload level is entered. To alleviate long term overload, additional overload control actions are performed in the long term overload levels. Once in a long term overload level, long term overload measurements will increment or decrement the long term overload level in essentially the same way as the short term overload level is incremented or decremented except that the process of departing from the lowest long term overload level reverts the system to the highest short term overload level, that no increment from the highest long term overload level is allowed, and that the measurements in long term overload levels are derived from load measurements taken over a longer interval.

BRIEF DESCRIPTION OF THE DRAWING

FIG. 2 is an overall flow diagram illustrating the process of determining overload levels and autonomously responding to that overload within a module;

FIGS. 3 and 4 are flow diagrams illustrating the process of autonomously initiating overflow response actions changing the level of the overflow and switching between long term and short term overflow levels.

DETAILED DESCRIPTION

Figure 1:
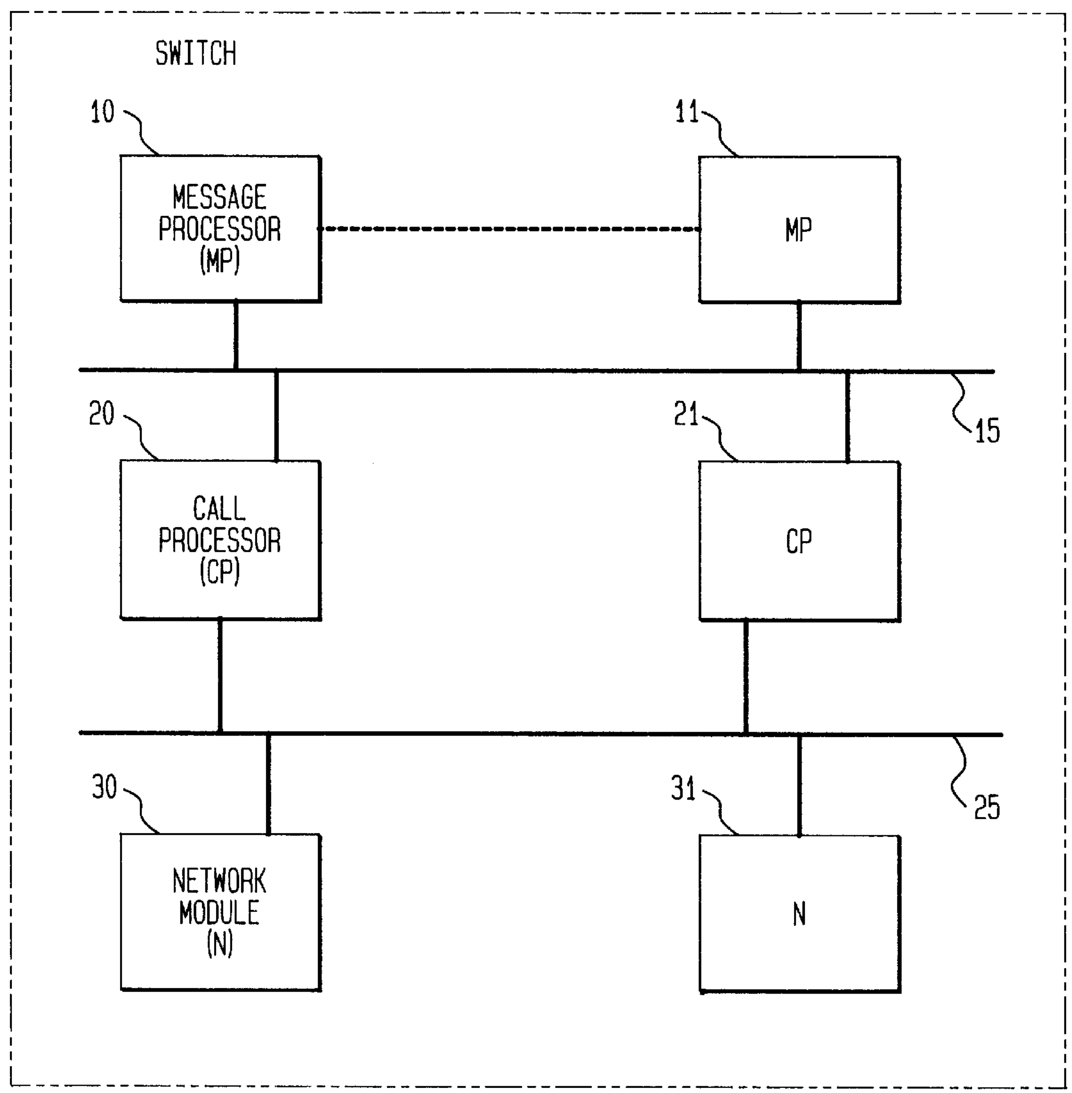
FIG. 1 is a block diagram showing a plurality of modules in an exemplary switching system.

In this document, we describe an overload control consisting of two inter-related mechanisms: short-term and long term. In many situations, short-term control actions have smaller impact on the system performance while long-term actions have more severe performance consequences. Thus, it is desirable to distinguish between short-term and long-term. In particular, it is important that a unified control method that does not distinguish between the two should not be applied to the system under overload. The term overload state will be used to include the zero overload state, i.e., the normal state wherein there is no overload in a module.

In the autonomous control method described first, individual switch components (nodes or modules) measure their performance and take action based on these measurements. All nodes are autonomous and independent and their action may not have relevance to the states and/or actions of other nodes. In contrast, in the "integrated" overload approach used, in one embodiment, when one or more modules enter a long-term overload level, the states of all nodes are simultaneously considered in determining the course of action during the control.

The short-term control as the name implies is in reaction to measurements of system performance over short periods of time. This is intended to capture the transient and short-term overload conditions that may not be long lasting and thus, may not require actions that result in heavy penalties (e.g., high call blocking rates.) Typical short-term control may consist of deferring processing of non-critical tasks; these tasks will be processed after the transient overload has disappeared. The severity of the action in this case is not critical and is transient.

For example, a non-critical task may be to respond to a request to re-set registers and memory blocks that are allocated to switch maintenance and administration and have no immediate implications to the main tasks such as processing calls in progress in the switch. It is important to note that such non-critical tasks cannot be deferred for a long period of time because in that case, operation of the switch or the underlying network may be disrupted. Short-term actions may also include deferring a critical task performed by the switch only if the severity of the condition implies that more critical action is needed. For example, a typical severe short-term action may be to drop to a low rate the lower priority call signaling messages that arrive to the switch and relieve the switch nodes of the processing load that would otherwise be brought in by the blocked calls.

Under long-term control, deferring tasks (such as non-critical signal processing) cannot help by itself. More severe action such as blocking incoming signals to the system along with deferring non-critical tasks may be necessary. The blocking rate in this case is higher than those that may have been applied in the short-term case.

An objective to the method described herein is to distinguish between these two cases and to devise a specific method for measurement and control in each case.

In the following description, the specific node performance measure that is monitored is processor utilization. However, this measure is considered here only as a preferred exemplary embodiment. Other measures such as queue length, buffer usage utilization, number of busy trunks in the fabric controllers, etc., can be used. Such choices depend on the specific implementations, switch architecture, and also on the overall switch performance measures. In this description, the term "load" will be used as the representative measured control parameter.

Node processor utilization is measured and monitored as the representative control parameter that is an indicator of a node overload state. This indicator is then mapped to the appropriate level of overload and a corresponding control action is applied. Described hereinafter is the whole process starting with how measurements are performed (short-term and long-term). Processor utilization corresponds to the percentage of time that a processor (such as the Central Processing Unit (CPU) of a node in a switch is busy. In order to arrive at these measures, processor busy periods are accumulated and divided by the total length of the measurement interval. This ration is called processor utilization. In the preferred embodiment, a filtered measure (using, for example, an exponential smoothing technique) of several measurement intervals is used. If the measured ratio is less than an acceptably moderate level (usually around 40%–50%) the node is said to be in normal state and usually no overload action is required unless other modules are in an overload state, as discussed hereinafter. When. the ratio reaches levels of 80%–90% or higher, the module is likely to be in severe overload condition and an action should be applied. In between the two levels of 50% and 90%, one may decide to take actions that are not as severe as at the 90% level. However, no action is also not appropriate.

In order to illustrate the difference between short-term and long-term, suppose that in an uncontrolled switch over intervals of say 100 ms (milliseconds) the particular node processor that is monitored demonstrates the following measurement results, hereafter called control parameters, over three consecutive intervals in two separate measurements (referred to as Cases A and B):

Case (A): 80%, 40%, 50%.

Case (B): 80%, 75%, 90%.

In Case (A), although the node is in 80% utilization over the first 100 ms interval, it is not as highly utilized in the next 2 intervals. This is not the case in Case (B) where although the utilization is equally high in the first interval, it remains high in the next 2 intervals as well. We refer to Case (A) as one possibly requiring a short-term control action while in (B) a longer term action is needed. Initially, the actions over the first 100 ms interval in both Cases A and B are the same; however, as measurement of next intervals become available, in Case (A) we reset the short term control and resume normal operation while in Case (B) we maintain the previous control (or increase the severity of control action). By the time measurements of the third interval become available, Case (A) demonstrates a normally operating module while Case (B) may imply the need for even more severe action such as blocking incoming signals at a higher rate than initially envisaged. The severity of action (such as the rate of blocking of incoming signals) depends on the specific module's overall performance. For example, if the overall performance measure of the module is so bad in Case (B) during the third interval that the utilization should be brought down to a target utilization of say, 65%, then a higher rate of blocking is needed than if the target utilization is 75%.

The notation and concepts in this section are similar to those of the flow charts. Time intervals are numbered by (n). These intervals in the above example were assumed to be T=100 ms in length. In addition to observing the results of utilization measurement over a T=100 ms interval, we also observe these measurements over a window of size W(S), representing the number of consecutive intervals T that are used in reaching a short-term control decision. Similarly, W(L) represent the number of consecutive T intervals that are used in arriving at a long-term control action. X(n) represents the measured utilization over interval (n). The measure that is used for short-term control during interval (n) is represented as S(n). This measure is a filtered version of X(n) such as from the following expression:

$$S(n)=a(1)X(n)+a(2)X(n-1)+ \ldots +a(W(S))X(n+1-W(S))$$

where, a(j) is the filtering (smoothing) factor applied for the measured utilization over the j'th interval from the most recent measurement, and a(1) is the smoothing factor for the most recent measurement interval. S(n) when measured at a given time interval (n) reflects the smoothed value of the utilization over the past W(S) consecutive intervals. S(n) is updated at each interval, by discarding the earliest measured value, X (n−W(S)) and from the sample and shifting by one the smoothing coefficients applied to the measurements. Then, a new measurement sample is added to the set of W(S) measurements.

Similarly, the long term measured value at interval (n), L(n), is determined. The window size for L(n) is W(L), wherein W(L)>W(S).

The process of monitoring and control works as follows: We measure and store values of S(n) and L(n) for each interval n. At the beginning of each interval, S(n) is compared against two thresholds X(min,i) and X(max,i), where i represents the present short term overload "level" of the switch module. For example, in normal operation, when a module is started, the overload level is the no overload level, i=0. The thresholds are chosen such that they reflect a switch behavior that is acceptable for the particular level (i). If the measured value S(n) exceeds the X(max,i) at this level, then the level is changed be at level (i+1) over the upcoming interval. Similarly, if the measured value S(n) is below X(min,i), then the level is changed to be at level (i−1) in the upcoming interval. When S(n) falls in a given level (i) (that is S(n) is between X(min,i) and X(max,i)) it is not necessary to check the long term measured parameter (L(n)). In this case, a decision has been reached as to the state of the node overload and the appropriate controls for level (i) are applied (This would consist of short-term overload control actions designed for level (i)). However, if the measured value S(n) has exceeded the highest level after step-wise exceeding the next higher threshold in each level, then the node has passed the short-term overload level and is now in the long-term overload. In this case, the measured parameter L(n) is compared against similar long-term overload thresholds and appropriate controls are applied.

Note that at each step, the node can only step up or down from its existing state level by 1. When state of a node drops below the lowest long-term overload, then it enters the highest short-term overload level. Similarly, when it exceeds the highest short-term overload level it enters the lowest long-term overload level. When a system reaches the highest long-term level, it remains in that level; when the system the state of the node drops below the lowest short term overload, it exits the overload status altogether.

FIG. 1 illustrates the pertinent aspects of the architecture of a switch 1 on which applicants' invention is implemented in one preferred embodiment. The switch comprises a plurality of message processors (MP) 10, . . . , 11 interconnected by a bus system 15. The message processors communicate with each other and outside switches to process messages representing connection and disconnection requests. The message processors communicate over bus system 15 with a plurality of control processors 20, . . . , 21 for controlling a plurality of network modules 30, . . . , 31. The control processors and network modules communicate with each other over bus system 25. The message processor, control processor and network modules each contain a program controlled processor system for carrying out the function required of the processor and for executing the overload control programs described further herein.

FIG. 2 illustrates at a high level the process of determining an overload state in one of the modules. Action Block 201 indicates that a short term overload measurement interval T(S) for measuring indications of short term overload is selected. The measurement interval T(S) is selected when the system is initialized. In applicants' preferred embodiment, T(L), the measurement interval for long term overload, is the same as T(S), but more intervals are used for control and smoothing. In alternative embodiments the interval can be dynamically selected. In Action Block 203 a window W(S) for observing a number of consecutive measurement for determining a short term overload is selected (Action Block 203). This window is also selected at initialization time. In Action block 205, a window W(L) for observing a number of consecutive overload measurements for determining the level of a long term overload is selected. Again, W(L) is selected at initialization time. A typical value for a high capacity switch with high capacity modules might be T(S)=0.1 second, W(S)=3, and W(L)=10. With these numbers long and short term overload measurements are made every 0.1 second and are filtered over a period of 0.3 seconds for monitoring the short term overload state and over a period of 1 second for changing the long term overload state.

It is possible to measure different system performance measures, or stimulus parameters for detecting the short- and long-term overload states. In this case, T(S) and T(L) (corresponding to the short- and long-term measurement intervals, respectively), can be chosen independently as well as for different control parameters.

The control parameter X(n) for the nth interval is measured for each interval and the past W(L) measurements are stored (Action block 207). These values are then used in Action block 209 to determine a filtered version of the measurements. Based on the measured control parameter determined in Action block 209, the presence of overload is detected; if overload had previously been detected, the overload level is adjusted in accordance with the teachings of FIGS. 3 and 4.

In applicants' preferred embodiment, the highest level of short term overload control leads to the lowest level of long term overload if the overload increases, and the lowest level of long term overload control leads to the highest level of short term overload if the overload decreases. Action blocks 207, 209 and 211 are performed in real time in a working system. The control parameter is measured over an interval in the interval number representing essentially the time, for example, the time since the system was initialized. During the interval, the control parameter measurement of the load is X(n). Based on the present and several past values of the control parameter, S(n) or L(n) for short term and long term load, respectively, is calculated. A typical formula for calculating S(n) is $S(n)=a(1)X(n)+a(2)X(n-1)+a(3)\ X(n-2)$. With this filtering function, only the three most recent values of the load measurement are used. In this typical example a(1) equals 0.5, a(2) equals 0.4, and a(3) equals 0.1. For the case of calculating the long term control parameter L(n), the same techniques are used except that a series of ten measurements are used to create the filtered long term load and a series of ten coefficients are used for the filtering functions. The ten coefficients b(1), b(2), . . . , b(10) in one embodiment have the values 0.23, 0.17, 0.11, 0.1, 0.09, 08, 07, 0.06, 0.05 and 0.04.

While in the above example, the filtering is simply a linear addition of weighted control parameters from the present and previous intervals, other filtering methods such as exponential smoothing can be used. The process of filtering such data is well understood by those of ordinary skill in the art.

After the states levels of the various processors and fabrics are determined, there are two possibilities in applying control. They are:

1. Autonomous Action by Each Node in the Switch:
   In this case, each processor or fabric takes independent action. This is one action corresponding to each overload level. This type of control generally results in sub-optimal performance. However, it may be less costly than the other approaches because there is no need for a central controller. Reliability of the central controller in this case will not be an issue. Also the cost of collecting and processing state information of many modules in order to be able to define an overall system view is avoided.
2. Integrated (Overall) System State Approach:
   Since switch nodes are nowadays more reliable and processing cost is rapidly declining, it is feasible to assume that the individual nodes' states can be determined and combined in a central processor or in each processor, in order to create an "overall" system state. Actions in this integrated case are based on the overall observed system state, rather than the individual node states. A distributed switch with integrated control has overload performance that is superior to the autonomous overload control type.

Because long term overload is a more serious condition, one arrangement is to use autonomous action as long as none of the modules are in long term overload, and to switch to integrated action as soon as any module is in a long term overload state. Clearly, such a switch can also be made according to some other criteria based on the overload state of the modules.

In many circumstances, different processors, or fabrics in a distributed switch, may be heterogeneous; thus, it is advantageous to choose different measurement intervals for individual processors and fabrics. For example, a longer measurement interval may be chosen for slower processors and fabrics, while a shorter measurement interval is appropriate for faster ones. However, all such measurements should be mapped to a set of states which will ultimately be used to decide on the overload actions. Also, the measured parameters for each can be different. For example, while buffer size may be a proper measure in deciding the overload state of a message processor (e.g., MP 10) in a switch, in the case of a bufferless fabric (e.g. network module 31), this measurement is not available and thus cannot be applied. In the latter case, a different measure such as the number of existing calls, or the number of outstanding call requests, or other fabric-specific measures may be more appropriate for measurement and control.

Similarly, the window sizes for short-term and long-term measurements may be chosen differently.

Furthermore, based on the past measurement values it may be appropriate that the future measurement intervals be adjusted. Dynamic adjustment of measurement intervals may also occur as a result of time-of-day or actual measurements of control parameters at different fabrics and/or processors.

FIGS. 3 and 4 illustrate the process of entering an overload level, changing overload control actions within the short term or long term overload control system, and going between the short term and long term overload control. FIG. 3 is entered in Action block 301. One of the allowable current levels of overload control i is the level 0 representing no overload. This is the state which is entered when the system is initialized. In Block 301, the short term overload measure, S(n) is calculated. This short term control parameter is compared with the maximum value of control parameter associated with the present level i of short term overload state (test 303). If the load does not exceed that threshold, then test 305 is used to determine whether the control parameter is now below the minimum threshold for level i. If it is not, i.e., if the results of both tests 303 and 305 are negative, it is an indication that the control parameter is within the level of the current overload and the module remains in that level (Action Block 307). Action Block 301 is then re-entered to calculate the next filtered control parameter sample.

If the result of test 303 is positive, i.e., if the control parameter exceeds the maximum threshold for the present level, test 311 is used to determine whether the highest level of short term overload has been exceeded. If not, then the overload level is incremented to the next higher short term overload level and Action Block 301 is re-entered to await the next filtered load value. Similarly, if the result of test 305 is positive, i.e., if the load is less than the bottom threshold of the present overload level, then that level is decremented (Action Block 315), and action 301 is re-entered to calculate the next filtered short term control parameter value. (Clearly there is no minimum threshold for the case of i=0 representing the absence of overload so that a positive result of test 305 means that a lower level, possibly the i equals 0 level, exists.)

If the result of test 311 is positive, i.e., if the maximum threshold for the highest level of short term overload has been exceeded, then Action block 321 of FIG. 4 is entered. When Action block 321 in entered from test 311, the initial value of long term overload control j is 1 (Action block 312, FIG. 3). (For simplicity in explaining FIGS. 2 and 3, it is assumed that j=1 is the lowest long term overload state. In practice, it is more likely that the lowest value of j is one higher than the highest value of i). Action Block 321 calculates the long term filtering of load to determine if the load is within the present level of long term overload. Test 323 is used to determine if the present load exceeds the maximum threshold for the present level of long term overload control. If not, then test 325 is used to determine whether the control parameter is less than the minimum threshold for the present level of long term overload control. If the results of both tests 323 and 325 are negative, then Action block 327 is entered which signifies that the overload control remains at the present level and Action block 321 is re-entered.

If Action block 323 indicates that the maximum threshold for the present level has been exceeded then the overload control level is incremented (action block 329) and Action block 321 is re-entered.

If the present filtered load is less than the minimum threshold for the present long term overload state, (positive result of test 325), then test 331 is used to determine whether j is already at the level 1. If so, j is decremented to 0, and Action block 301 is re-entered with i at its highest level (Action Block 332). If the result of test 331 is negative, i.e., that the long term overload level can still be decremented without going to a short term overload level, then j is decremented and Action Block 321 is re-entered to calculate the next value of L(n).

The result of executing the program specified by the flow diagrams of FIGS. 3 and 4 is that in case of excessive load, a short-term overload level is entered which is gradually incremented if the filtered short term-load exceeds various thresholds; if the highest threshold is exceeded, then a long term overload level is entered and the long-term overload level is incremented if the filtered long term load exceeds the various long term overload thresholds.

Similarly, a decrease in the load allows the overload level to be decremented and allows for an escape from a long-term overload level to a short-term overload level.

In this part of the description, control actions (autonomous control) are confined to the module having either short-term or long-term overload, and the control action for a module corresponds to that module's overload level. However, it is sometimes desirable to alter overload controls based on the simultaneous states of several or all modules, (integrated control). For example, consider a system, which has a single MP10 and a single CP 20. If both the MP and the CP are in a normal state or a short-term overload state then the normal or short-term overload controls are invoked within each module. However, if either module is in one of two long-term overload levels, then the following actions are performed, which actions result is superior overload performance than in the autonomous case.

1. Call processor in low long-term overload, message processor in no long-term overload: message processor blocks new incoming calls with probability P(1). call processor notifies external switches to throttle traffic at throttle level 1.
2. Call processor in high short-term overload state, message processor not in long-term overload state: message processor blocks new incoming calls with probability P(2), which is greater than P(1). Call processor notifies external switches to throttle traffic further (throttle level 2).
3. Message processor in long-term overload state, call processor not in long-term overload state: message processor defers overhead message processing and blocks new incoming calls with probability P(3), where P(3)>P(2). Call processor reduces its overhead message processing.

4. Call processor in lower long-term overload state, message processor in long-term overload state: message processor defers overhead message processing and blocks new incoming calls with probability with P(4), where P(4)>P(3). Call processor notifies its incoming switches to throttle traffic at throttle level 1.
5. Call processor in high, long-term overload state, message processor in long-term overload state: message processor defers its overhead message processing and blocks new incoming calls with probability P(5), which is greater than P(4). Call processor notifies its originating switches to throttle traffic at throttle level 2.

In this example, we have not considered actions to balance the load more equitably among similar processors. It is assumed that the techniques, which are well known in the prior art, are used to balance the load among similar processors so that in general, all similar processors are in the same or nearly the same overload levels. To the extent that these are not the same, the system response can be modified so that a lower level of system overload control is invoked if only some of the processors of one kind are in the long-term overload level of the most heavily overloaded processor of a particular type. For example, if there were two message processors in the above example, only one of which is in a long-term overload level, then the system overload response associated with the fourth overload category (throttle level 1 and new incoming calls blocked with probability P(4)) is desirable.

Figure 5:
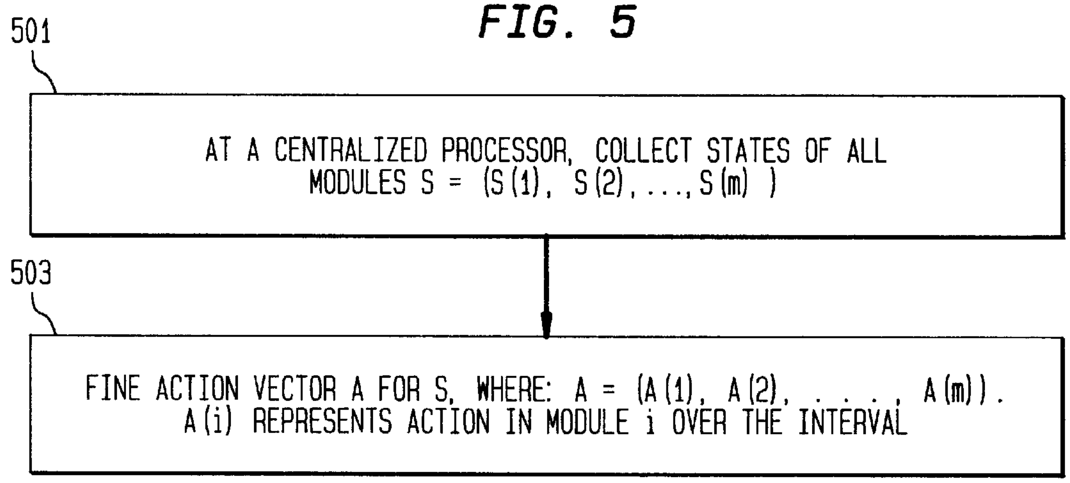
FIGS. 5 and 6 illustrate how modules respond to indication of their own overflow plus those in other modules.

FIG. 5 illustrates one embodiment of the integrated system state approach. A centralized processor, assignable at initialization time and reassigned in case of trouble, collects the overload state of each module of the system. This processor then derives, either through application of a semi-Markov decision process or other heuristic, or through a pre-stored vector, a vector specifying for each module the appropriate response action. A centralized processor collects the state of each module of a system (Action Block 501). The centralized processor then calculates an action vector specifying the action sate to be executed in each module of the system (Action Block 503). The modules are then notified of the action state for the next interval. This process is repeated at regular intervals.

Suppose a switching system consists of 3 modules, M1, M2 and C1. Each module has several thresholds used in determining their respective states. As discussed earlier, these thresholds are levels of buffer size, queue size, processor initialization, etc., that are considered critical for overload measure. Suppose S=(S(1), S(2), S(3)) represents system state at some interval of observation. Here, S(1) is the state (e.g., occupied buffer length, occupied queue length, processor utilization level) for M(1), S(2) is the state for M(2), and S(3) for C(1). An example heuristic state/action is given in the following table:

TABLE I

| S(1) | S(2) | S(3) | A(1) | A(2) | A(3) |
|---|---|---|---|---|---|
| 0 | 0 | 0 | 0 | 0 | 0 |
| 1 | 0 | 0 | 0 | 0 | 0 |
| 1 | 1 | 0 | 1 | 0 | 0 |
| 1 | 1 | 1 | 1 | 1 | 0 |
| 2 | 0 | 0 | 2 | 1 | 0 |
| 2 | 1 | 1 | 2 | 2 | 1 |

When the system state S=(0, 0, 0), which corresponds to no overload in any of the modules, A=(0, 0, 0), corresponding to no action at any of the modules. When S=(1, 0, 0) which corresponds to M(1) in overload level 1, but M(2) and C(1) in no overload, A=(0, 0, 0) corresponding to no action at any of the modules. Heuristically, this is because a slight change in the state of one module is assumed a perturbation which does not require taking an action unless it becomes more serious, when S=(1, 1, 0), only module M(1) takes action "1". This action may correspond to, for example, deferring O, A and M operation.

The measurement methods used in integrated approach is identical to the autonomous/independent case. As in the autonomous/independent case, there are short-term and long-term intervals of measurement, and after departing the highest short-term overload level, a particular module enters the lowest long-term overload level, etc. What makes a difference here in the integrated case is that rather than deciding for an action in a particular module only based on its own state, the decision is based on the collective set of states of all modules. Thus, in the example of previous table, "0" refers to the lowest long-term state for M(1). In the table when S=(2, 0, 0), corresponding to M(1) being in the lowest long term overload, while M(2) and C(1) are in no overload, the corresponding action is indicated as A=(2, 1, 0). This action corresponds, for example, to blocking calls in M, at a given rate (Say 5%), and at the same time deferring operations, administration and maintenance (O, A and M) processing in M(2) (referred to as action "1" in the example), and "do nothing" in C(1). This Action A=(2, 1, 0) is in contrast to the action when S=(2, 1, 1) in the table. In this latter case, M(1) is in the lowest long term overload, while M(2) and C(1) are found in state "1" which corresponds to some short-term state for these modules. In this case, A=(2, 2, 1) corresponding to 5% blocking at M(1), 5% at M(2), and deferring O, A and M in C. Note that when modules are heterogeneous, state "1 ", or "2", or . . . may imply different overload states and actions "1", "2", etc., may also imply different actions. For example, in the example above, if M(2) is twice as fast as M(1), S(2)=1 can mean a larger buffer size than S1=1. Similarly A(2)=2 can mean say 2% blocking, while A(1)=2 can mean 5% blocking, etc.

More generally, an optimum arrangement for controlling overload is one wherein one processor continuously monitors the load state of each module of the system, and based on the state of all these modules, selectively applies overload control to a appropriate ones of these modules. Such an arrangement may require a complex calculation to determine an optimum response in each module. Compromises to the ideal model can be made in a number of ways. Instead of using a continuous measurement of load, the load measurement may be provided at discreet intervals such as the measurement interval for the autonomous overload control case described above. Further, instead of using exact values of load, the overload level as described above, can be used to describe the load characteristics of each module. A further compromise may be invoked for certain systems wherein system control is only invoked if at least one module is in the long term overload state. A still further compromise may be the use of only the selected overload control levels as the overall load control responses which the control processor can impose on individual modules.

FIG. 5 is a general method for the use of an integrated system approach toward overload control. An exemplary system is the one shown in FIG. 2 which has three groups of processors MP10, . . . MP11; CP 20, . . . CP 21; and N 30, . . . N 31. It is assumed that MP10, . . . MP11, and CP 20, . . . CP 21, are homogenous groups of processors such that any processor can handle any input message and any call processor can handle any output message from a message processor. For the autonomous case, each processor simply calculates its own load and based on that load, derives an overload level which level specifies a corresponding group of overload control actions. In contrast, for the integrated system case, each processor still calculates its own overload level, but transmits this level either in terms of an overload number, or as an overload level, to a centralized processor. The centralized processor has the task of deciding what overload control level should, in fact, be applied to each of the processors in the system. In one embodiment, the centralized processor does not adjust the overload control level of any processor unless at least one processor has a load that corresponds to a long-term overload level. In that case, the actions described above for FIG. 5 are executed only if one or more processors are in long-term overload. Alternatively, the actions described for FIG. 5 are executed even if none of the processors in the system has a load that corresponds to a long-term overload.

Figure 6:
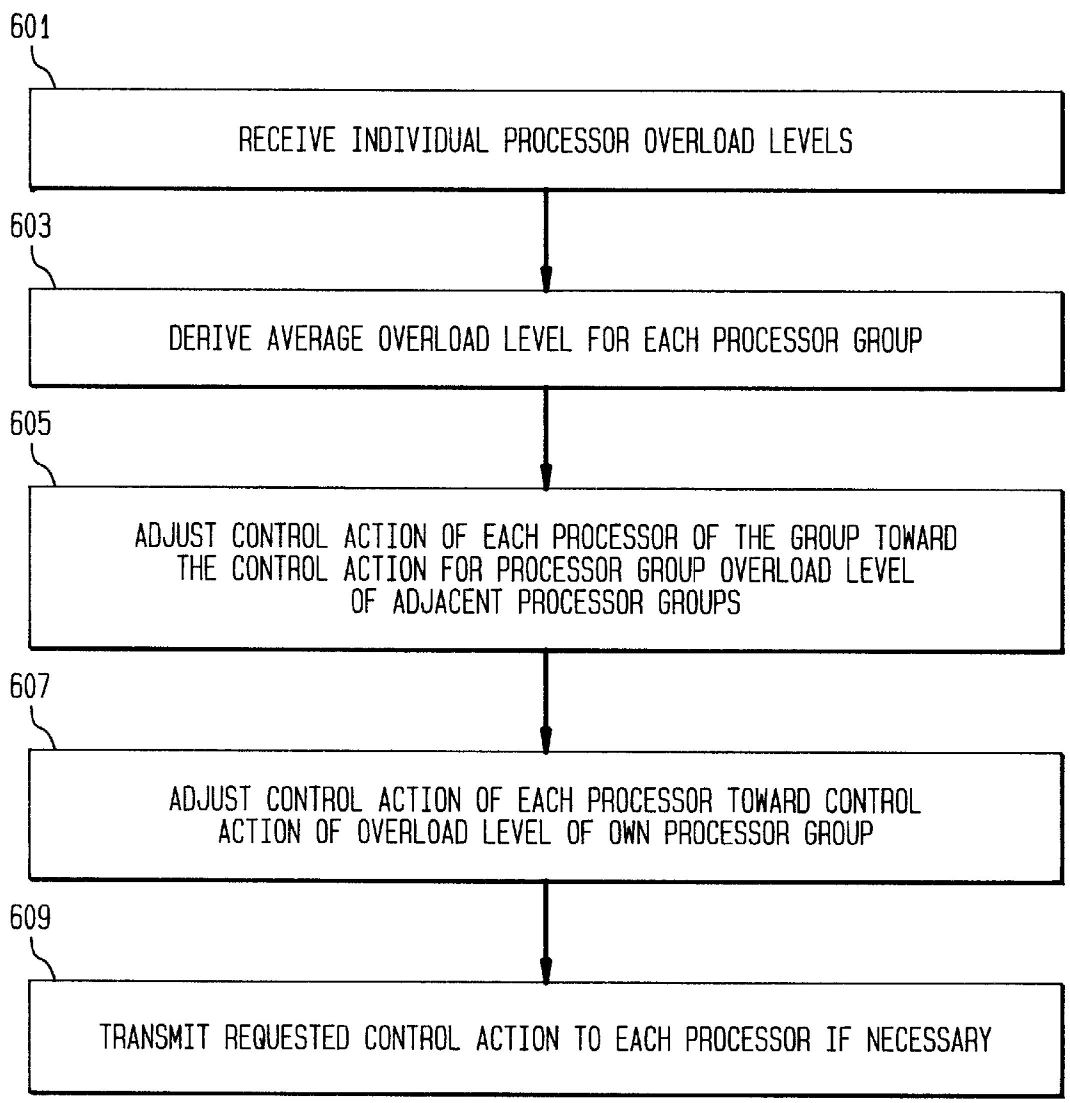

FIG. 6 illustrates a less general method, but one which has the advantage that the amount of computation required in the centralized processor is sharply reduced. The basic philosophy of the method of FIG. 6 is that the effect of overload of other professors can be simplified by considering only the "average" overload of each fractional group of processors, i.e., the MPs, the CPs, and the Ns. The basic approach uses two methods of adjusting an action level with respect to the overload level of a particular processor. First, if the processor has an overload level that is far removed from the overload levels of the other processors in the group, the action level is adjusted up or down toward the overload level of the processors of the group. Second, if the "average" overload level of the group differs substantially from the overload level of an adjacent group, the action level of the members of the group is adjusted toward the overload level of the adjacent group. Effectively, both types of adjustments serve to "flatten" the action levels both horizontally (within a group) and vertically (from group to group).

This is illustrated in FIG. 6. The centralized processor receives reports of the overload state of each processor (Action Block 601). It is desirable that this report only be sent where a change has occurred. The centralized processor derives an "average" overload level for the group. This "average" can be weighted toward the higher overload states within the group since the gaps in overload are not necessarily equal in all overload state transitions. The "average" overload level also need not be an integer, but can include fractions. Then two types of adjustments are made to the overload levels of each processor to derive the action level for that processor. If there is a substantial difference, i.e., more than a predetermined amount, weighted appropriately toward the higher overload states, and adjusted experimentally in a system, then the average action level of a processor group is adjusted toward the higher of the overload levels of the adjacent processor groups. Next, if the overload level of the processor differs by more than a second appropriately weighted predetermined amount from the average overload state of the processor, the action level of that processor is adjusted toward the average. The adjustments can be fractional and cumulative, and are rounded to a an integral adjustment of the action level as compared to the overload level. In general, the adjustment is unlikely to be greater than a single step between the action level and the previous level. The new control action level is then transmitted to each processor whose action state has changed (Action Block 609). Note that for the integrated control case, the number of control action levels may be greater than the number of overload levels of each module.

For the case of non-homogeneous processors within a functional group, the state of the individual processors can be weighted in deriving the average of the group. For example, if one of the MPs is slower than the others, its overload state should be weighted less heavily in deriving the overload state of the group.

The above description is of one embodiment of applicant's invention. Many other variations can be found by those of ordinary skill in the art. The invention is only limited by the attached claims.

We claim:

1. In a module of a distributed real time control system, a method for responding to overload comprising the steps of:

assigning a plurality of levels of load short term overload and long term overload of said module;

assigning to each of a plurality of short term overload levels, a corresponding one of a plurality of short term overload control response actions;

assigning to each of a plurality of long-term overload levels a corresponding one of a plurality of long-term overload control response actions;

responsive to an initial determination that a measured control parameter exceeds a lower threshold of a lowest level for short-term overload, entering the lowest short-term overload level;

incrementing a declared short term overload level of said module if said control parameter exceeds an upper threshold for a current declared short term overload level;

decrementing a short term overload level if said control parameter is less than the lower threshold for a current short term overload level;

if said system is in a highest short-term overload level, and said control parameter exceeds the upper threshold of said highest short-term overload level, entering a long-term overload level;

incrementing or decrementing a long term overload level if the load exceeds or is less than the upper or lower threshold, respectively of a current long term overload level;

exiting downward from a lowest long term overload level to a short-term overload level if the control parameter is less than the lower limit of said lowest overload level; and going from the lowest declared short-term overload level to a no overload level if the system is in a lowest short-term overload level and the control parameter is less than a minimum corresponding to that level;

wherein none of said plurality of short-term overload control response actions throttle traffic processed by said system;

wherein each of said plurality of long-term overload control response actions throttle traffic processed by said system;

wherein in a given system, a minimum interval for progressing between short-term overload levels is less than a minimum interval for progressing between long-term overload levels.

2. The method of claim 1 wherein said measured control parameter represents usage of a control processor of said module.

3. The method of claim 1 wherein said measured control parameter represents a number of entries in a queue of said module.

4. The method of claim 1, wherein said measured control parameter is a filtered measure derived by accumulating a plurality of weighted previous load measurements over an interval of time, and wherein said measured control parameter is accumulated over a longer interval of time when the system is in long-term overload than when the system is in short-term overload.

5. The method of claim 1, wherein said measured control parameter represents a measurement of different parameters for long term than for short term overload.

* * * * *